Dec. 17, 1946.   H. JENKINS   2,412,617
SYSTEM OF COMPASS COMPENSATION
Filed Aug. 24, 1942   2 Sheets-Sheet 1
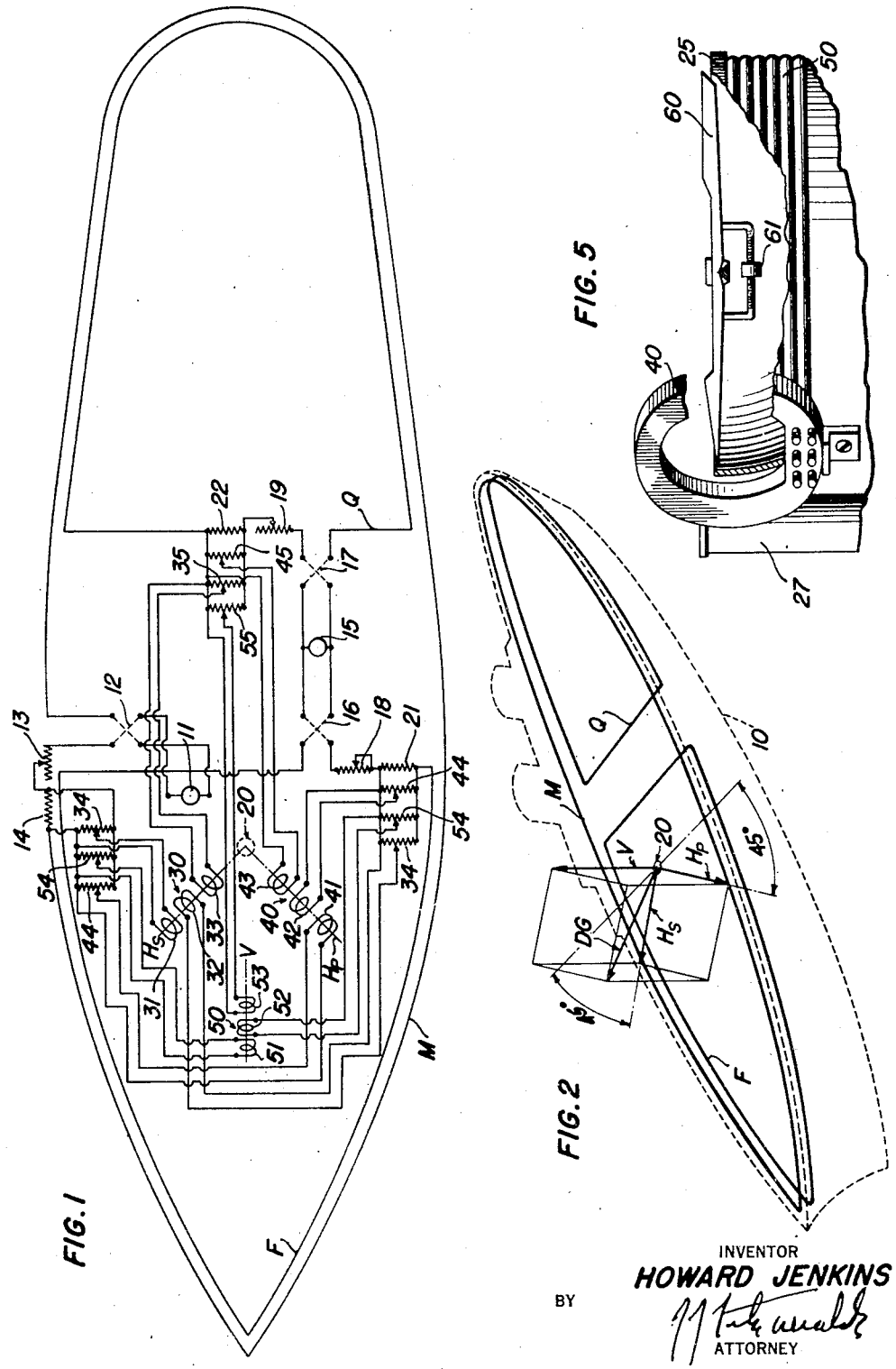
INVENTOR
HOWARD JENKINS
BY
ATTORNEY Dec. 17, 1946. H. JENKINS 2,412,617
SYSTEM OF COMPASS COMPENSATION
Filed Aug. 24, 1942 2 Sheets-Sheet 2

INVENTOR
HOWARD JENKINS
BY
ATTORNEY

Patented Dec. 17, 1946

2,412,617

UNITED STATES PATENT OFFICE 2,412,617

SYSTEM OF COMPASS COMPENSATION

Howard Jenkins, Arlington, Va.

Application August 24, 1942, Serial No. 455,910

10 Claims. (Cl. 33—225)

(Granted under the act of March 3, 1883, as amended April 30, 1928; 370 O. G. 757)

This invention relates to magnetic compasses and in particular to a system of compensating magnetic compasses for errors induced by the degaussing circuits utilized for protection against magnetic mines.

It is the present general practice to install large coils of wire on the forward and after portions of a vessel passing through enemy waters and to provide means for passing electric current through the coils for the purpose of neutralizing the magnetic field set up by said vessel as a protection against magnetic submerged mines. Such procedure is referred to as degaussing and the coils employed by this process are called degaussing coils, the forward coil being referred to as the F coil and the after coil being referred to as the Q coil. In addition to the F and Q coils, a third coil referred to as the M coil is also employed to neutralize the magnetic field of said vessel. Other coils or combinations of coils, including an S and A coil, are also used. In some instances lack of material has necessitated the installation of a single M coil.

As is well known, a steel vessel has a magnetic character of its own which includes the subpermanent magnetism created in building the vessel and the transient magnetism induced in the vessel by the earth's magnetic field. To render such a steel vessel magnetically neutral at all times, as is desirable in the degaussing operation, it is necessary to adjust the current through the degaussing coils to a particular predetermined value which varies with changes in the vessel's head and with changes in latitude.

The degaussing circuits of the vessels induce a magnetic field at the binnacles, similar to the field produced by the vessel's subpermanent magnetism in that the compass deviation caused by the presence of this field would be essentially semicircular if the field were not varied in intensity and direction. The effect of the degaussing field upon the magnetic compass is in other respects dissimilar to the compass deviation caused by the subpermanent magnetic field of the vessel. For example, large heeling errors are produced by the degaussing fields. Furthermore, the total effect of the degaussing field is electromagnetic in nature; that is, the magnitude and direction of this field change as the current magnitude and direction through the separate coils is adjusted or changed for different headings and for different latitudes. Compensation for the degaussing field cannot therefore be easily accomplished by the utilization of permanent magnets as is the case with the semicircular deviation produced by the subpermanent magnetism of the vessel.

Since different degaussing coils are installed in different locations on the ship and are operated separately for different conditions for heading and latitude, the resultant magnetic field at the binnacle which is produced by this degaussing flux may be considered separately for each coil. The field from any individual degaussing coil will vary proportionally with the excitation of the degaussing coil and its direction will completely reverse with changes in the coil polarity. Thus, by utilizing compensating or corrector coils located at the binnacle and connecting each compensating coil in circuit with its respective degaussing coil, the current in the compensating coils may be maintained at a fixed ratio wtih the current in the degaussing coil.

It is, therefore, an object of this invention to automatically compensate for the degaussing field by establishing at the binnacle, a separate magnetic field for each separate degaussing circuit, and to cause the field to vary in direction and intensity in a fixed ratio with changes in direction and magnitude of the current in said degaussing circuit so that the said separate field will at all times equal the field intensity of its respective degaussing circuit at the center of the binnacle and will oppose its direction.

It is a further object of this invention to arrange about the binnacle three compensating windings for each effective degaussing circuit with the axes of the windings mutually disposed at 90° so that the field produced by each winding may be vectorially combined to produce a resultant field equal in magnitude but opposite in sense to the magnetic field through the center of the binnacle produced by the respective degaussing circuits from which the said windings are energized.

Other objects and many of the attendant advantages of this invention will be appreciated as the same become better understood by referring to the following detailed description when considered in connection with the accompanying sheets of drawings wherein:

Fig. 1 illustrates diagrammatically an arrangement of the degaussing coils and the circuit connection leading therefrom to their respective compensation coils;

Fig. 2 is a perspective view of the degaussing coils and the resultant field at the center of the compass produced by the degaussing circuit together with its three vector components;

Fig. 5 is an elevational view of the binnacle provided with a dip needle utilized in compensating for the vertical component of the degaussing field.

Figure 3:
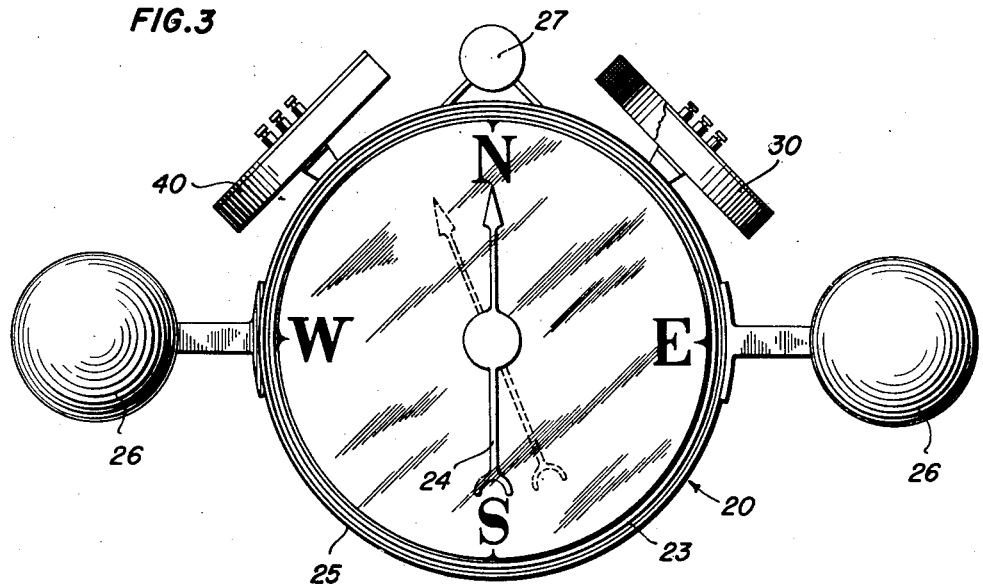
Fig. 3 is a plan view of the Navy standard binnacle showing the prefered position of the horizontal compensating coils.

Referring now to the drawings on which like numerals of reference are employed to designate like parts through the several views and in particular to Fig. 2 thereof, there is shown thereon a vessel, such as a freighter or transport, indicated generally by reference numeral 10 and provided with a degaussing coil F within the forward part of the vessel and a degaussing coil Q within the after part of the vessel. A degaussing coil M is also provided which, as illustrated, completely follows the general outline of the vessel. The vector DG is drawn from the center of the compass 20 to illustrate that the magnetic field produced by any one or all of the coils M, F, or Q, has a magnitude and direction at this point equal to the vector DG. It is this field which produces the compass deviations referred to above.

In order to effectively neutralize the influence of this field upon the magnetized elements of a compass, another field is established through the center of the compass which is equal and opposite to the field illustrated by the vector DG. This is preferably accomplished in my invention by establishing component fields along three axes which are mutually arranged at 90° so that the resultant will be equal and opposite to the vector DG.

In Fig. 2, I have illustrated the vector DG as resolved into its three components, the vertical component V and two horizontal components $H_s$ and $H_p$. As illustrated, the axes of the three components are mutually arranged at 90° with the two horizontal components $H_s$ and $H_p$ falling along the line drawn at an angle of 45° forward the starboard and port beam respectively of the vessel 10. The axes of the starboard and port horizontal components thus contains the intercardinal compass points when the ship head is north or south magnetic. I have resolved the vector DG into components along these lines arranged at 45° relative to the beam primarily for convenience since from an inspection of Fig. 3 it will be apparent that the corrector coils 30 and 40 may be conveniently located with their axes on these 45° lines without impairing the vision of the compass card and without interfering with the compensating spheres and/or compensating magnets.

If the magnetic field is set up along each of the vector components equal in magnitude but opposite in direction from the field represented by the vectors V, $H_s$ and $H_p$, the effect of the vector DG would be neutralized. In this manner, the effect of the degaussing field on the compass would be compensated for by simply properly proportioning the magnitude of each of the said component fields.

In Fig. 1, there is illustrated in plan view the general outline of the degaussing coils M, F and Q. The M coil of the vessel 10 is energized from a suitable generator 11 through the reversing switch 12 and the series resistors 13 and 14. The resistor 13 is adjustable to vary the current magnitude to the M coil. Let it be assumed that the resistor 13 is set to a value whereby the field produced by the M coil will have a magnitude and direction at the center of the compass 20 equal to the vector DG of Fig. 2. To compensate for this field there is established along each of the three components V, $H_s$ and $H_p$, a field of an intensity equal to the vectors V, $H_s$ and $H_p$, respectively, but of a direction opposite thereto. The three coils 30, 40 and 50 of Fig. 1 are each placed so that their axes coincide with a different vector component. More specifically, the axis of the coil 50 is vertically arranged relative to the vessel and is positioned relative to the binnacle so that it passes through its center. The axes of coils 30 and 40 are each coplanar with the axis of the magnetic members of the compass and are arranged relative to the binnacle with the axis of each on adjacent intercardinal compass points when the ship's heading is magnetic north or south. Each coil is provided with a plurality of separate individual and coaxial windings one for each effective degaussing circuit, to provide a means for establishing for each separate degaussing circuit three separate vector component windings positioned along each ordinate so that the magnitude of each vector component can be made to follow directly the variations in the current magnitude of its respective degaussing circuit. To establish these individual vector components necessary to neutralize the vector DG produced by the coil M, the individual windings 31, 41 and 51 of the compensating coils 30, 40 and 50 are energized from the source 11 in order that the vector sum of the component fields produced by these compensating windings may at all times equally oppose the vector DG, the current for supplying these windings being preferably obtained from the resistor 14 connected in series with the M coil. This resistor 14 is designed to supply a voltage difference across its terminals of about six volts when the maximum rated current flows in the M coil. The current magnitude in each compensating winding 31, 41 and 51 may be separately regulated by the potentiometers 34, 44 and 54, respectively, so that no change in magnetic field will occur at the center of the binnacle when the degaussing M coil is turned on or the current through it is varied. When the resistors 34, 44 and 54 have once been set, their settings need not be altered with changes in degaussing current.

For the purposes of illustration, the degaussing coils F and Q are shown energized from a separate motor-generator set 15 through the reversing switches 16 and 17 and the adjustable resistances 18 and 19, respectively. Three separate windings 32, 42 and 52 are provided on the compensating coils 30, 40 and 50 respectively for the degaussing F coil. The current for these windings is obtained from the resistance 21 placed in series with the F coil and regulation of the current delivered to each of the windings is accomplished by adjusting the resistors 34, 44 and 54, respectively, so that no change in the fore and aft, athwartships, or vertical, magnetic force occurs across the center of the binnacle with the degaussing coil F turned on or off or the current through it varied. When the resistors 34, 44 and 54 have once been adjusted, their settings need not be altered with changes in degaussing current. Three windings 33, 43 and 53 are also provided on the compensating coils 30, 40 and 50 respectively for the degaussing Q coil. The current for these windings is obtained from a resistance 22 placed in series with the Q coil. The proper ratio of current magnitude in each of these coils to the current magnitude in the Q coil is established by the variable resistors 35, 45 and 55. Once the current ratios have been properly adjusted for this, the last effective degaussing coil, the operation of all compensating coils or windings will be entirely automatic and the magnetic compass will continue to point in the direction of the magnetic north at all times and on all headings.

I have purposely limited the several views to three degaussing coils, namely M, F and Q, and also to three separate windings on each of the compensating coils. However, it should be obvious from the foregoing that other coils known to the art as A and S coils may also be used, and if these coils appreciably affect the compass, a compensating winding may be provided therefor. It has been my observation, however, that in most ships the compass is affected only by two degaussing coils depending upon the location of the binnacle relative to the coils. The forward compasses are usually affected only by the M and F coils, whereas, the aft compass will be affected only by the M and Q coils.

Figure 4:
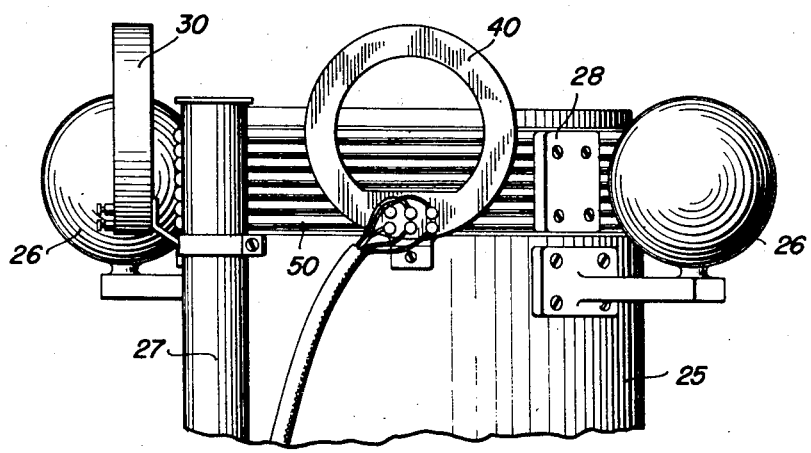
Fig. 4 is an elevational view of the binnacle of Fig. 3 showing also a preferred arrangement of the vertical compensating coils.

For a better understanding of the specific structures involved in the arrangement of these coils on the binnacle, reference may be had to Figs. 3 and 4 of the drawings wherein reference numeral 20 is used to indicate the compass. For the purpose of illustration, a compass bowl 23 is illustrated as containing a pivoted compass needle 24 and is supported in the binnacle 25 by knife-edge pivots on gimbal rings (not shown). The binnacle also supports the soft iron hollow spheres 26 which are mounted on each side of the binnacle so that their distance from the compass may be varied and a holder 27 for the Flinders bar. The coils 30 and 40 are shown mounted on the starboard and port sides, respectively, of the fore and aft center line of the ship with the axis of each at an angle of 45° relative thereto and on a level with the axis of the compass needle 24. As may be seen from Fig. 4, the heeling coil 50 consists of a number of turns of a multiconductor cable wrapped about the binnacle. This type of coil is preferable since it is adaptable to binnacles of various sizes and shapes but preformed coils may also be used. Access to the terminals of each conductor is had through the junction box 28 so that the number of turns or number of separate windings may be varied.

The heeling coil 50 compensates for the vertical component of the resultant degaussing field in the center of the binnacle. The current through the heeling coil is adjusted by replacing the compass with a conventional dip needle illustrated in Fig. 5. The procedure for adjusting the current in the heeling coil is as follows:

With all of the degaussing coils deenergized and with all of the compensating coil control circuits set at zero, the dip needle 60 is brought into balance by adjusting the weight 61 provided thereon. The M coil is now energized to the maximum rated current and the dip or unbalance of the needle is noted. This unbalance is due to the vertical component V of the M coil and may be compensated for by adjusting the resistor 54 to increase the current in the winding 51 of the heeling coil 50 until the dip needle 60 is again brought to a balanced position. When properly compensated, the dip needle should remain balanced for any setting of the resistor 13.

Procedure similar to that set forth above is followed for adjusting the heeling components for other degaussing coils (F, Q, A or S), the heeling effects of which are sufficient to warrant provision of compensating windings.

In adjusting the current ratio in the horizontal correcting coils, the dip needle is replaced by the compass and all of the degaussing coils are deenergized. The vessel is then placed on a steady northeast or southwest heading by the magnetic compass. The M coil is now energized and the deviation of the compass noted. Since the north and south line of the compass or the axis of the compass needle 24 is at an angle of 45° to the left of the ship's center line, the axis of the magnetic needle 24 coincides with the component Hp, thus the deviation of the compass upon this intercardinal heading can be caused only by the degaussing fields horizontal component Hs which is 90° from the axis of the component Hp. The compensating component may, therefore, be created by energizing the winding 41 of the port coil 40 and adjusting the resistance 44 until the compass needle returns to the original northeast or southwest heading. Without changing the heading, the procedure outlined above is repeated for adjusting the windings 42 and 43 of the coil 40 for the horizontal component Hs of the degaussing coils F and Q.

Adjustment of the current in the individual winding of the starboard coil 30 is accomplished by a procedure similar to that set out above utilizing a single degaussing coil at a time with the ship on a steady northwest or southeast heading.

If desired, the compass needle may be deflected relative to the ship rather than swinging the ship to maintain the respective headings. This can be accomplished by carefully placing permanent magnets about the binnacle so as to create a deflecting field perpendicular to the bisector of the angle between the original and the desired deflected position of the compass needle.

Although I have shown and described certain and specific embodiments of the present invention, I am fully aware of the many possible modifications. Therefore, this invention is not to be restricted except insofar as is necessitated by prior art and the spirit of the subjoined claims.

The invention described and claimed herein may be manufactured and used by and for the Government of the United States of America for governmental purposes without the payment of any royalties thereon or therefor.

I claim:

1. In a system for automatically compensating a magnetic compass for errors produced by the degaussing field of a vessel upon which the compass is mounted comprising the combination of a pair of degaussing coils disposed in a predetermined spaced relation on said vessel, a pair of compensating coils each having at least two separate coaxial windings, a binnacle for supporting the compass, means securing the compensating coils to said binnacle with the axis of each coplanar with the horizontal and vertical axes of the rotatable element of said compass and disposed on opposite sides of the fore and aft center line of said vessel at an angle of 45° relative thereto, so as to contain the intercardinal compass points when the axis of said vessel coincides with the magnetic meridian, and means energizing said degaussing and compensating coils with a direct current so that the current magnitude in each degaussing coil and its respective winding of each compensating coil may be separately adjusted to maintain a fixed ratio.

2. In a system for automatically compensating a magnetic compass for errors produced by the degaussing field of a vessel upon which the compass is mounted comprising in combination at least a pair of degaussing coils, said coils being disposed in a predetermined spaced relation on said vessel, a source of direct current electrical potential, means energizing said coils from said source to produce a resultant magnetic field for neutralizing the magnetic field of said vessel, three compensating coils each having at least two separate and coaxial windings, the axes of each of said coils being mutually disposed at right angles, means securing said coils to said vessel in a predetermined fixed space relation to said compass with the axis of one vertically disposed relative to said vessel, and with the axes of the remaining coils substantially coplanar whereby the said axes establish the direction of the horizontal and vertical components of a space vector extending from the center of said compass, means connecting a separate winding of each of said compensating coils in circuit with a separate degaussing coil so that the current magnitude in each of said windings may be separately adjusted in suitable proportion to the current magnitude in its respective degaussing coil whereby to produce a magnetic field equal in magnitude but opposite in sense and direction to the component of the resultant degaussing field at the center of said compass, as produced by said separate degaussing coil having a direction along the axis of said winding.

3. In a system for automatically compensating a magnetic compass for errors produced by the degaussing field of a vessel upon which the compass is mounted, the combination including at least a pair of degaussing coils disposed in a predetermined space relation on said vessel, a pair of compensating coils each having at least a pair of separate and coaxial windings, the axes of said coils being substantially coplanar and horizontally disposed relative to said vessel, means securing each of said compensating coils to said vessel in a fixed predetermined space relation closely adjacent to said compass, a source of direct current electrical potential, means connecting each degaussing coil to said source, and means connecting a separate winding of each of said compensating coils in circuit with a separate degaussing coil so that the current magnitude in each of said windings may be separately adjusted in suitable proportion to the current magnitude in their respective degaussing coils to automatically compensate for the horizontal component of said degaussing field.

4. In a system for automatically compensating a magnetic compass for errors produced by the degaussing field of the vessel upon which the compass is mounted, comprising in combination at least a pair of degaussing coils disposed in a predetermined space relation on said vessel, a compensating coil vertically disposed relative to said vessel and having at least two separate coaxial windings, said compensating coil being closely adjacent to said compass, a source of direct current potential, and means connecting each degaussing coil and a respective winding of said compensating coil to said source so that the current magnitude in each degaussing coil and the current magnitude in its respective winding will bear a fixed ratio whereby no change in the vertical magnetic force at the center of said compass will result from variations in the current magnitude in said degaussing coils.

5. In a system for automatically compensating a magnetic compass for errors produced by the degaussing field of the vessel upon which the compass is mounted, comprising the combination of a pair of degaussing coils disposed in a predetermined spaced relation on said vessel, a source of direct current potential, means energizing said coils from said direct current source to neutralize the magnetic field of said vessel, at least a pair of compensating coils arranged on said vessel in predetermined space relation closely adjacent to said compass, means energizing each of said coils from the said source so that the current magnitude in each compensating coil will maintain a fixed ratio with the current magnitude in a separate one of said degaussing coils.

6. In a system for automatically compensating a magnetic compass for errors produced by the magnetic field of the degaussing circuit of a vessel upon which the compass is mounted comprising the combination of at least a single degaussing coil disposed in predetermined spaced relation on said vessel, means energizing said coil to produce a resultant degaussing field variable in magnitude and direction with changes in heading and latitude, respectively, of said vessel, to at all times at least partially neutralize the ship's magnetic field, and means disposed closely adjacent said compass for continuously producing a resultant compensating field of a magnitude equal to the magnitude of said resultant degaussing field at the center of said compass but of an opposite sense.

7. In a system for automatically compensating a magnetic compass for errors produced by the magnetic field of the degaussing circuit of a vessel upon which the compass is mounted, comprising the combination of at least a pair of degaussing coils disposed in predetermined spaced relation on said vessel, means energizing said coils to produce a resultant degaussing field variable in magnitude and direction to neutralize on varying heading and in varying latitudes the magnetic field of said ship, means for producing closely adjacent said compass a compensating field along a vertical axis through the center of said compass, means for producing closely adjacent said compass a compensating field having an axis in a horizontal plane containing the axes of the rotatable element of said compass, means automatically varying the strength and direction of said compensating fields in accordance with variations in the strength and direction of said degaussing field whereby the resultant of said horizontal and vertical component fields will be equal in magnitude but opposite in sense to the magnitude and direction of said resultant degaussing field at the center of said compass.

8. In a system for automatically compensating a magnetic compass for errors produced by the degaussing field of a vessel upon which the compass is mounted comprising the combination of a degaussing coil disposed in a predetermined spaced relation to said compass, a source of direct current electrical potential, means energizing said coil from said source to produce a magnetic field to at least partially neutralize the magnetic field of said vessel, a compensating coil, means securing said compensating coil to said vessel in a predetermined spaced relation closely adjacent to said compass, and means connecting said compensating coil in circuit with said degaussing coil so that the current magnitude in said compensating coil may be adjusted to maintain a fixed ratio with the current magnitude in said degaussing coil.

9. In a system for automatically compensating a magnetic compass for errors produced by the degaussing field of a vessel upon which the compass is mounted comprising the combination of a degaussing coil disposed in a predetermined spaced relation on said vessel, three compensating coils secured in predetermined spaced relation closely adjacent to said compass with the axis of each mutually disposed at right angles, and means connecting each of said compensating coils in circuit with said degaussing coil so that the current magnitude in each of said windings may be separately adjusted in suitable proportion to the current magnitude in the degaussing coil when the said degaussing coil is connected to a direct current source of electrical potential.

10. In a system for automatically compensating a magnetic compass for errors produced by the magnetic field of the degaussing circuit of a vessel upon which the compass is mounted comprising the combination of at least one degaussing coil disposed in predetermined spaced relation on said vessel, means energizing said coil to produce a resultant degaussing field, variable in magnitude and direction with changes in heading and latitude, respectively, of said vessel, to at all times at least partially neutralize the ship's magnetic field, and means for producing a magnetic field at the compass which has a magnitude variable with said degaussing field to maintain a fixed ratio therebetween, and a direction opposite the direction of said degaussing field at the center of said compass.

HOWARD JENKINS.